United States Patent
Plata Andres et al.

(10) Patent No.: US 7,644,181 B2
(45) Date of Patent: Jan. 5, 2010

(54) METHOD FOR ROUTING A SERVICE REQUEST IN A TELECOMMUNICATION SYSTEM

(75) Inventors: Isabel Plata Andres, Ulm (DE); Victor Ferraro-Esparza, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 476 days.

(21) Appl. No.: 10/517,180

(22) PCT Filed: Jun. 13, 2003

(86) PCT No.: PCT/SE03/00999

§ 371 (c)(1),
(2), (4) Date: Sep. 19, 2005

(87) PCT Pub. No.: WO2004/006534

PCT Pub. Date: Jan. 15, 2004

(65) Prior Publication Data

US 2006/0098621 A1 May 11, 2006

(30) Foreign Application Priority Data

Jul. 2, 2002 (SE) .................................. 0202059

(51) Int. Cl.
*G06F 15/173* (2006.01)
*H04L 12/26* (2006.01)
*H04L 12/16* (2006.01)

(52) U.S. Cl. .................. 709/239; 709/240; 709/242; 370/252; 370/260; 370/262; 370/282

(58) Field of Classification Search .................. 370/252, 370/260, 262, 282
See application file for complete search history.

(56) References Cited

U.S. PATENT DOCUMENTS

| | | | |
|---|---|---|---|
| 2001/0027478 A1* | 10/2001 | Meier et al. | 709/206 |
| 2002/0083198 A1 | 6/2002 | Kim | |
| 2005/0207361 A1* | 9/2005 | Rosenberg et al. | 370/282 |
| 2007/0263565 A1* | 11/2007 | Roy | 370/328 |

FOREIGN PATENT DOCUMENTS

| | | |
|---|---|---|
| EP | 1009152 A | 6/2000 |
| WO | WO 0251188 A | 6/2002 |

OTHER PUBLICATIONS

Dalgic et al., "True number portability and advanced call screening in a SIP-based IP telephony system.", Jul. 1999, IEEE, pp. 96-101.*
Faltstrom P: "E.164 number and DNS" RFC 2916; Sep. 2000; XP002192484; RFC 2916 Chapter 3.1.2-3.2.3.

* cited by examiner

*Primary Examiner*—Ashok B Patel

(57) ABSTRACT

A method for routing a service request in a telecommunication system in cases where the identifier received for the destination of the service is not (or can not be) suitable for routing the service, such as when a E.164 number is received in IP based multimedia telecommunication systems. Upon reception of a service request in a telecommunications node of the telecommunication system in charge of serving control for services, a query comprising the received identifier is made to a translation database. As a result, a plurality of identifiers related to the received identifier are received that can have different formats and imply different service types. The service is further routed from said telecommunications node according to an identifier selected among said plurality of identifiers that contains the primarily received identifier in the user name portion.

7 Claims, 1 Drawing Sheet

METHOD FOR ROUTING A SERVICE REQUEST IN A TELECOMMUNICATION SYSTEM

FIELD OF THE INVENTION

The present invention relates to a method and an apparatus for routing a service request in a telecommunication system towards a destination user

BACKGROUND

Users of telecommunication systems use to be assigned to one or more identifiers. Such identifiers are intended to be used by other users for requesting communications, and can take various formats according to the specific telecommunication technology for which they where devised.

For example, E.164 numbers (ITU recommendation E.164, May 1997) (commonly known as "telephone numbers") are usually used as identifiers in legacy telecommunication systems such as: PSTN (Public Switched Telephone Network), ISDN (Integrated Services Digital Network), or 2G (second generation) mobile systems. E.164 numbers where primarily defined for allowing routing telephony calls based on its numeric structure. So, for example, an E.164 number such as "+34 91 555 XXXX" could identify a user in Spain within the local area of Madrid.

Identifiers used in modern telecommunication systems providing, for example, multimedia services (such as: video conference, data transfer, multimedia messaging, etc., as well as traditional voice-only calls) use to align with URI (Uniform Resource Identifier) format. Usually, these modern systems support also legacy identifiers, such as E.164 numbers, for interworking purposes with legacy systems, as well as for keeping associated to the same user an old (legacy) identifier. URIs are well-known identifiers widely used by Internet application and services for identifying resources (either: abstract of physical entities). URIs are further divided as "locators" (Uniform Resource Locators, URLs) or "names" (Uniform Resource Names, URNs). As opposed to URNs, that are intended to merely name a resource (even when the resource itself ceases or becomes unavailable), URLs identifies a resource by its location in a network (i.e.: identifies and locates it). For the sake of a greater simplicity, and given that the abstract conceptual differences between URIs and URLs are tiny enough for considering them equivalent when referring string of characters that "identify" resources, the term URL shall be used hereinafter.

Nowadays, URLs are assigned as identifiers to a plurality of heterogeneous resources for which service requests can be received. For example, an URL can be used to identify a web page, an electronic mail account, a file downloadable file, etc. Identifiers associated to users that are served for a given service in a specific network domain, use to be URLs that has a format that comprises: a user-name portion and a domain-portion, separated by the separator character "@". The domain-portion identifies the network domain serving a given user, who is named (and identified) as specified in the content of the user-name portion in said domain.

Telecommunication systems using a multimedia protocols, such as H.323 protocol (ITU-T recommendation H.323, November 2000) or SIP protocol (IETF RFC2543 "Session Initiation Protocol", March 1999), use URLs to identify their users (among other type of identifiers). So, a user having a subscription with a telecommunications operator that owns a telecommunication system supporting a multimedia protocol such as SIP, uses to be assigned to an identifier having an URL format (known as SIP-URL) that identifies said user in the network domain of said operator; for example "sip: John.Doe@OperatorA.se". Similarly, for other communication services, such as traditional telephony, fax, electronic mail, modem based data calls, etc., a plurality of URLs can be defined to reach the destination user in the corresponding service point according to the requested service (e.g.: a plain telephone, the inbox of a mail account, a fax machine, or a modem); for example: "tel:+98-7-6543210", "mailto: John.Doe@OperatorA.se", "fax:+98-7-6543210", "modem:+98-7-6543210; type=v110".

A given user having a subscription with a telecommunications operator can, depending on the capabilities of the telecommunication system of said operator, an also depending on his/her subscription characteristics, receive a plurality of telecommunication services, or just only one type of services, having subscribed other services with another operator.

For example, a user can have a subscription with Operator-A for basic telephony service, multimedia communication service and electronic mail service. Also, a user can have, for example, basic telephony and multimedia services subscribed with Operator-A, while keeping a subscription with Operator-B for solely multimedia service. An example of a telecommunication system able to provide a variety of telecommunication services and handle various kind of identifiers for users (including E.164 identifiers and URLs) is a 3G (third generation) mobile system having the, so called, IMS (Internet Protocol Multimedia Subsystem) for providing multimedia services.

E.164 identifiers have been widely used for identifying users of telecommunication systems providing telephony services; and, as mentioned above, many systems still use E.164 identifiers as the only type of identifier that a user (originating user) can use for requesting a communication service towards another user (destination user). The appearance of new telecommunication services made traditional telephony operators to offer some of these new services to their users. Among reasons such as: to allow an smooth migration towards a new telecommunication service replacing an equivalent old one (e.g.: a multimedia service in replacement of a traditional voice-only telephony service), and to avoid user's inconvenience of publishing his/her new identifier(s) for the new service(s) subscribed; a given user subscribes a new service with his/her operator, uses to keep his/her old E.164 identifier associated also to this new subscription. So, for example, a given operator owning a 2G system and a 3G system with IMS, allows users subscribed to its 2G system to migrate their subscription to its 3G system while keeping their old E.164 identifiers. This allow these users to receive services from other legacy telecommunication systems, such as for example, calls or SMS (Short Messages) that are originally addressed using E.164 identifiers.

When routing a service request to its destination user that contains an E.164 as identifier for said user, for some telecommunication systems (or for some parts of said system through which a certain protocol is used for signaling the service) said E.164 identifier can be found as not suitable for routing and/or identification purposes. Also, in a given point of the execution of a service request, it can be desirable to select a service point (e.g.: a given terminal of the destination user) where to finally deliver the service, being said user identified in said terminal with an identifier which is not the same as the one received in the service request.

PRIOR ART SOLUTIONS

The aforementioned scenario drove to devise solutions for obtaining the collection of identifiers related to a given identifier assigned to a user; and, more precisely (given the wide use made of E.164 identifiers), to obtain the collection of identifiers related to a E.164 identifier.

For example, IETF's RFC2916 ("E.164 number and DNS", September 2000) (wherein the term DNS stands for "Domain Name System") discloses a DNS-based service to obtain information related to the various identifiers and service types related to a given E.164 identifier. The service provides the plurality of URLs related to a given E.164 identifier, and can be used, for example, when a service request comprising an E.164 identifier is received (e.g.: a telephony call, a SMS, a multimedia session, etc.).

Hereinafter, the term "ENUM-DNS" will be used across the present invention to refer to the translation method and translation system (query translation mechanisms, DNS database structure, specific data structures for supporting translation of E.164 identifiers to URLs, etc.) disclosed in RFC2916 and summarized below (the same term is also utilized in another standard specification that will be further cited across the detailed description).

According to RFC2916, a plurality of identifiers are stored in a data base. Said data base is structured and accessed (queried) using the well-known DNS technology. For this purpose the received E.164 identifier is arranged (as described below) to query a DNS-based data base in a similar manner as other DNS-based queries are done. Since the domain "e164.arpa" is being populated to provide the infrastructure in DNS systems for storage of E.164 numbers, said domain identifier is included in the query. For example, for a received E.164 identifier such as:

9876543210 the next query is should be made to a DNS:

0.1.2.3.4.5.6.7.8.9.e164.arpa wherein the received digits in the E.164 identifier have been inverted to fulfill existing DNS structured analysis (structured hierarchically from right to left).

As a result a plurality of URLs that are stored in the DNS in relationship with said E.164 identifier are received as a result of said query. Each of these URLs can be related to a specific service, although more than one can be related to the same service. For example, the query can yield a set of identifiers such as:

| | |
|---|---|
| sip: John.Doe@OperatorA.se | (a SIP-URL) |
| tel: +98-7-6543210 | (a TEL-URL) |
| fax: +98-7-6543210 | (a FAX-URL) |
| mailto: John.Doe@OperatorA.se | (a MAILTO-URL) |
| sip: JohnnyDoe@OperatorB.fr | (a SIP-URL) | that are stored in DNS as NAPTR RRs (Naming Authority Pointer DNS Resource Records), and that can be used as valid routable identifiers for further routing the service request that contained the E.164 identifier.

Among said identifiers, the querying entity (for example, a node in the telecommunication service) can select one of them and further route the service request according to it. For example, the most appropriate URL for delivering the requested service can be selected according to the requested capabilities; so for example, if the service requested is a voice call, then any SIP-URL can be selected for delivering it into a SIP-enabled terminal of the referenced destination user. Alternatively, the second URL (tel:+98-7-6543210) could be selected if it is desired to deliver the call, for example, to a plain telephone set through a legacy telephony system.

The further routing of the service, would depend on the nature of the selected URL. So, for example, if the selected URL has a user-name portion and a domain-name portion, then the service is routed primarily to the domain specified by the domain-name portion. For example, if the selected URL is the first one, then the service is routed towards the network domain of "OperatorA" in Sweden. If, however, the fifth URL is selected, then the service should be routed towards the network domain of "OperatorB" in France.

However, the above referenced RFC2916 does not discloses what to do when more than one identifier is received related to the same service type for a ENUM-DNS query translation mechanism (for example, when more than one SIP-URL are received as a response to a query made with an E.164 identifier), and even having the same "order" and "preference" fields.

Avoiding this non desirable situations by means of defining a single URL per service related to an E.164 identifier could be not feasible. In fact, the identifiers to be stored within NAPTR RRs in DNS related to E.164 identifiers can be (as for other similar issues dealing with identifiers of telecommunication users, such as Number Portability) a national regulatory matter that can differ from country to country. So, for example, in some situations the content of said resource records will depend to a great extent on what the user assigned to the E.164 identifier decides; while in other situations, the final content shall be determined by the operator that (originally) owns the subscription said E.164 identifier belongs to (i.e.: the "home operator" for said identifier). Then, this would drive to situations in which there can be more than one URL per service related to a given E.164 identifier stored in ENUM-DNS.

On the other hand, while keeping the global addressing possibilities of the E.164 identifier largely used by (assigned to) a given user, it should not be desirable to limit the number of subscriptions said user can have to a given (new) service (such as a multimedia service based on SIP) with more than one telecommunications operator.

SUMMARY OF THE INVENTION

The present invention provides a method, an apparatus and a system for routing a service request in a telecommunication system when a plurality of routable identifiers, related to an identifier received in the service request, are obtained for routing said service.

According one aspect of the present invention, it is provided a method for routing a service request that contains a specific identifier associated to the user who is the destination of said service. The method comprises a first step in which a plurality of identifiers are stored in relationship with said specific identifier; any of said plurality of identifiers being suitable for routing further service requests that can be received for said destination user and that comprise said specific identifier, wherein, at least one identifier of said plurality of identifiers has a format that comprises a user-name portion and a domain-name portion, being said specific identifier contained within the user-name portion. In a further step, when a service request comprising said specific identifier is received, all or a part of said plurality of identifiers related to the received specific identifier are obtained; then, if one identifier among said plurality of identifiers has a format as described above, and its user-name portion contains the received specific identifier, it is selected for further routing the service.

According to a further aspect of the invention, it is provided an apparatus for routing a service request in a telecommunication system. The apparatus comprises: communication means, arranged for receiving a service request that contains a specific identifier assigned to the user who is the destination of said service; processing means, arranged for obtaining the plurality of identifiers related to the received specific identifier that are suitable for routing a service requests that contains said specific identifier, and are further arranged for selecting an identifier among said plurality of identifiers that has a format that comprises a user-name portion and a domain-name portion, wherein the user-name portion contains the identifier received in the service request; and routing means arranged to further route the received service request according to the selected identifier.

According to a further aspect of the invention, it is provided a system for routing a service request in a telecommunication system. The system comprises: a data base and a serving node in said telecommunications network which is in charge of receiving a service request towards a destination user, and further routing said service request. The data base stores a plurality of identifiers that are related to a specific identifier associated to a user, and it is arranged for answering a query that comprises the content of said specific identifier with all or part of said plurality of identifiers. The serving node is arranged to send a query to said data base when it receives a service request that contains said specific identifier, said query comprising the content of the identifier received in the service request. When the response to the query is received in the serving node, it is arranged to select one identifier, among the plurality of identifiers received in the query, that has a format comprising a user-name portion and a domain-name portion if the user-name portion contains the identifier received in the service request.

In situations in which two or more identifiers are obtained for routing a service request, and specially when these identifiers are related to different service types and/or different network domains; the aspects disclosed in this invention allows to identify a particular network domain that holds an identifier that contains the one received in the service request, and to route the service to it. This permits further decisions for delivering said service, such as, for example, change of service type, selection of the destination terminal, etc., to be taken in the identified network domain.

DETAILED DESCRIPTION

Figure 1:
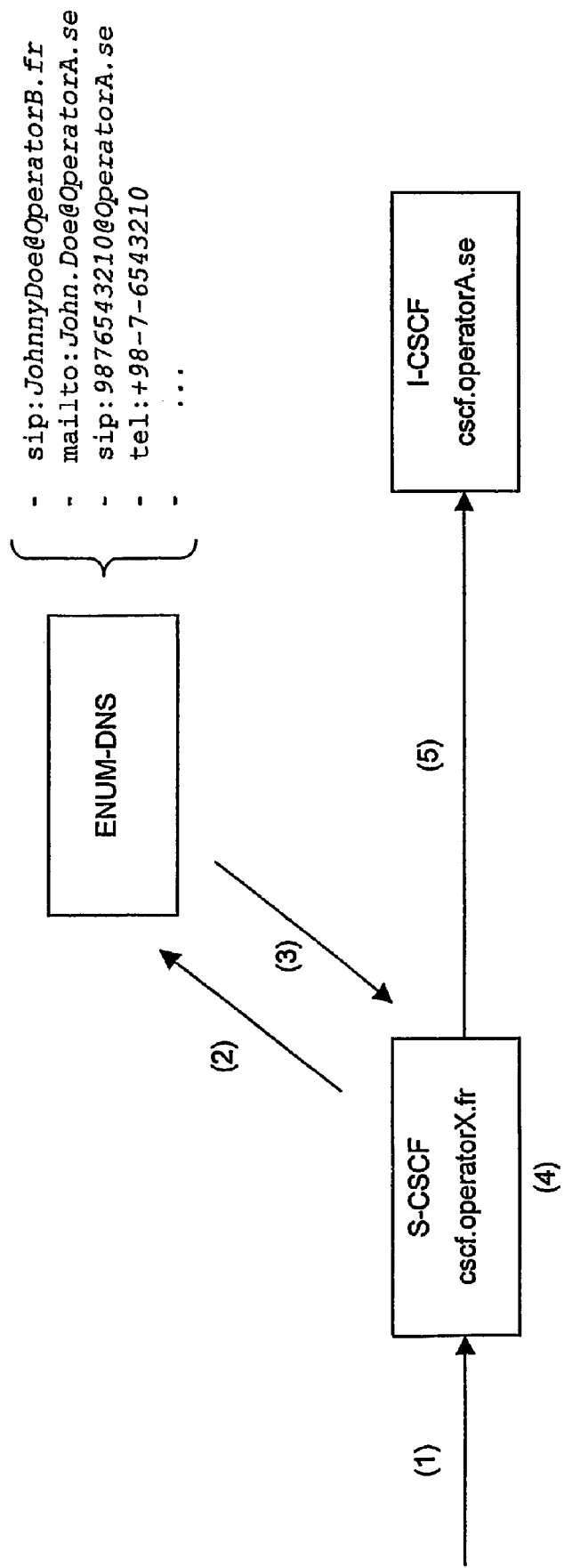
FIG. 1 shows an schematic view of a two serving nodes of a telecommunication system and a signaling flow of a service request and its further routing according to the invention.

The invention shall now be described in detail with reference to FIG. 1 according to a preferred embodiment. Said preferred embodiment considers a 3G mobile system that implements the so called IMS (Internet Protocol Multimedia Subsystem) and its standardized protocol for signaling services, as an example of a telecommunication system where the objects, features and advantages of this invention can apply. 3G systems are standardized by the standardization forum 3GPP ($3^{rd}$. Generation Partnership Project); being the well known protocol SIP (Session Initiation Protocol) the one chosen by 3GPP for signaling services within the IMS of a 3G system.

As mentioned previously, this kind of telecommunication systems (3G systems having the subsystem IMS) are able to provide variety of telecommunication services, such as voice calls through circuit-switched technology, voice or multimedia sessions through packet-switched technology, etc.; and handle various kind of identifiers for identifying users, including E.164 and URLs. So, when handling service requests, they can face the need of having to translate a given identifier, such as an E.164 telephone number, to a more suitable identifier, such as a SIP-URL, for further routing the service to its final destination.

However, it shall be understood that the scope of the present invention is not limited to said 3G systems nor to a specific signaling protocol; and that a skilled person can readily apply it to any telecommunication system that receives a service request that contains a given identifier associated to the destination of said service, when said identifier is, either: not suitable, or not wanted for further routing the service, and , at least, one of a plurality of routable identifiers related to said given identifier has to be used for said purpose.

For the IMS subsystem of a 3G mobile system, the 3GPP forum has defined a set of functional server entities in charge of various specialized functions. Among them there are the, so called, CSCFs (Call State Control Functions) which are in charge of serving control for services. A CSCF is a functional entity that performs a set of functions, such as: communication functions, to communicate with other entities; processing functions, for carrying out various service logic related to a service which is handled on it; and routing functions, for routing communications to other entities.

Depending on implementation aspects (not standardized by 3GPP, nor relevant for the understanding and scope of the present invention), a CSCF can be located within a physical machine (i.e.: a physical telecommunication node), or distributed across a plurality of physical machines that co-operate for performing its functions.

As a summary, it can be assumed that a CSCF is a serving node in a telecommunication system, such as an exchange in a PSTN, or a MSC (Mobile Switching Centre) in a 2G mobile system, in charge of performing control functions for the services it serves (i.e.: receives, routes or processes).

According to 3GPP terminology for IMS entities, a CSCF is further named as P-CSCF (Proxy-CSCF), I-CSCF (Interrogating-CSCF) or S-CSCF (Serving-CSCF) according to its role while handling a service request. So, a CSCF is named P-CSCF when communicating with an end user terminal, a I-CSCF when it is the first serving node within an operators network that receives services requests for a destination user who is subscriber of said operator, and S-CSCF when it is in charge of serving control for a service either: originated by a user, or terminating in a user, to whom it has been assigned to serve.

Reference is now made to FIG. 1 to illustrate the features of the present invention in a state-of-the-art 3G telecommunication system having IMS, and arranged to query an ENUM-DNS data base to obtain identifiers related to a given E.164 identifier.

In FIG. 1 two CSCFs are shown (S-CSCF, I-CSCF), each one having its own name (cscf.OperatorX.fr, cscf.OperatorA.se), that intends to represent a CSCF in the network domain of a given operator ("OperatorX") in a given country (France) that acts as Serving-CSCF for the user (or entity) originating said service, and another one belonging to another operator ("OperatorA") in another country (Sweden) that acts as Interrogating-CSCF for the destination of the service. However, both CSCFs depicted in FIG. 1 could belong to the same operator, being the case of distinct operators more appropriate to highlight the advantages of the invention.

At this point, it shall be noticed that, according to 3GPP specifications for IMS, the CSCFs are referenced with their individual names; as it is shown, for example, in 3GPP specification 24.228 (version V5.0.0, March 2002) that shows detailed signaling flows for services in IMS. Since said individual names (URLs) have to be resolved into the corresponding individual addresses suitable for addressing messages according to the underlying network protocol (e.g.: an Internet Protocol address, or IP-address), by using, for instance DNS or similar technique), they usually shall contain a domain portion identifying the network realm of the 3G system operator they belong to.

FIG. 1 also shows an ENUM-DSN data base. It can comprise one data base, or a set of hierarchically related data bases. In any case, particular implementation details related to said database, even if it is based on DNS technology or not, are not relevant for the scope of the present invention; wherein, the only relevant aspects for its understanding are: that said data base is in charge of storing a collection of identifiers related to a given identifier; and that said data base is arranged for receiving a query that contains said given identifier, and to answer the query with one or more among said plurality of identifiers.

Step 1 in FIG. 1 represents the reception of a service request in a CSCF (S-CSCF). The service can be, for example, a session (i.e.: call, multimedia session) requested towards a destination user that can be located within the network domain of the operator where said CSCF belongs to, or located within the network domain of another operator.

As cited above, services within the IMS of a 3G system are signalled by using SIP protocol. So, in this example case, a SIP message INVITE should be received by the communication means of said CSCF.

The INVITE received in step 1 shall contain a valid identifier for the user who is destination of the service. According to SIP protocol, said identifier takes the form of a URL. So, from SIP protocol point of view, there would not be any problem for routing the received service request (INVITE) according to the URL indicated as destination. Said URL could be, for example, a. TEL-URL (URL for telephony, as disclosed in RFC2806 "URLs for Telephone Calls", April 2000) or a SIP-URL (URL for SIP, as disclosed in the aforementioned RFC2543 "Session Initiation Protocol"). This would then not preclude to further route the received INVITE according to the received URL associated to the destination, and without modifying said URL.

In some situations, it might be wanted, however, to change the destination of the INVITE. For example, the destination user has registered into a SIP-based system from two terminals and has specified a certain delivery criteria for receiving services. In this case, for example, an specialized SIP-server can provide the appropriate identifiers in order to further route the INVITE to any (or both) of these two terminals.

However, as specified for example in 3GPP specification 23.228 (version V5.3.0, January 2002) (as well as in older versions of the same specification), non SIP-URLs (such as a TEL-URLs) shall not be used for routing services within the IMS of a 3G system, and would have to be converted into routable SIP-URLs using ENUM-DNS.

So, for example, if the URL for the destination received in the INVITE of step 3 is a TEL-URL such as:

tel:+98-7-6543210 it would have to be translated, by using ENUM-DNS or any other suitable mechanism into a routable SIP-URL.

For this purpose, a state-of-the-art serving node of a telecommunication system, such as the CSCF (S-CSCF) of the example case, would query in step 2 to an ENUM-DNS data base. The query would (as mentioned earlier in connection with the prior-art) comprise the received E.164 identifier arranged properly to query to a DNS-based data base. According to this, the query sent in step 3 would contain:

0.1.2.3.4.5.6.7.8.9.e164.arpa

The queried data base can have a plurality of identifiers related to the identifier "9876543210"; however, for the purpose of ENUM-DNS lookup, the only relevant to this kind of query (E.164 to URL) are the identifiers having URL format. Therefore, the ENUM-DSN data base would answer back with those URLs that are related in said data base to the E.164 identifier used in the query. Using the example case depicted in FIG. 1, in step 3 the CSCF (S-CSCF) would receive the next URLs:

sip: JohnnyDoe@OperatorB.fr
mailto: John.Doe@OperatorA.se
sip: 9876543210@OperatorA.se
tel: +98-7-6543210

In this example case, since multiple URLs are received, processing means in the CSCF (S-CSCF), unless forking method for multiple service delivery are implemented (which is costly and, sometimes, not effective), would have to select in step 4 one these URLs and route the service according to it. If the TEL-URL (tel:+98-7-6543210) is selected, a telephony call should then be established by towards the E.164 identifier contained in said TEL-URL. If said E.164 identifier does not belongs to OperatorX's domain, then it can be, for example, routed to the PSTN through the signaling and media gateways that link the telecommunication system of OperatorX with a PSTN operator that would end up in the network domain of the operator that handles a telephony subscription addressed by said .164 identifier.

Also, there could be the particular case in which all the received identifiers would belong to the same operator as the CSCF that received the INVITE (OperatorX). In this case, the CSCF (S-CSCF) can query with any of the identifiers to the home server entity (known as HSS or HLR) of said OperatorX that would, in turn, provide the address of the CSCF serving the corresponding user addressed by said identifiers. The service would be further routed with any of the received SIP-URLs to said CSCF that, in turn, could apply a further routing criteria according to, for instance, user preferences or user profile. So, in this latest case, it would be the CSCF serving to said user the one deciding where to route the service.

However, if the identifiers received in step 3 does not belong to the operator said CSCF (S-CSCF) belongs to (OperatorX), user preference data and/or user profile data of a destination user that belong to another operator (e.g.: OperatorA or OperatorB), and that would allow this CSCF (S-CSCF) to make a selection with a certain basis, are far away to be known (or accessed) by this CSCF of OperatorX. In fact, even the identifiers received in step 3 would belong to the same operator said CSCF (S-CSCF) belongs to, IMS standardized procedures preclude in this situation to a CSCF acting as a originating S-CSCF to query to the HSS for this purpose; and also, as mentioned before, IMS standardized procedures preclude the further routing of the service with other identifier than a SIP-URL.

Moreover, even in case that one or more SIP-URLs are received from the data base that pertains to the domain of OperatorX, if there is at least one SIP-URL among the ones received from the data base that pertains to another operator, it can be doubtful to take the decision of discarding that SIP-URL for further routing the service. For instance, two URL are received as a response to the query sent to the data base; one URL belongs to OperatorX, while the other to OperatorA. If the destination subscriber, to whom the E.164 is assigned, had originally, and still has, a basic (legacy) telephony subscription with OperatorA associated to said E.164 identifier (e.g: the number series of said E.164 identifier originally belonged to OperatorA); and has now also a multimedia subscription with said OperatorA; then to route the service towards OperatorA can probably be the most appropriate decision; mainly if the E.164 identifier can be subject to Number Portability and queries for portability are made in the Number Range Holder Network. So, once the service would get OperatorA's domain, user preferences and user profile related to the subscription of the destination user in said domain shall be further checked to determine the final routing and delivery criteria for the service. However, these (possible) facts can also be far away to be known (or accessed) by this CSCF (S-CSCF).

To overcome the problems above, as a part of the administrative process of populate data through DNS system (such as done for populating data related to Number Portability), an operator that has, for example, a situation similar as the one described above for OperatorA, in which, it holds a basic (legacy) telephony subscription addressed with a legacy identifier (such as an E.164 identifier) not suitable or not desirable for routing according to a new service type, and a new subscription for a new service type (such as multimedia services via SIP), or the same subscription encompassing both services; should populate a URL to be stored in DNS-ENUM that allows identify uniquely said operator's domain as the one primarily holding said legacy identifier (e.g.: an E.164 identifier).

In cases where the new service type uses URL identifiers, this can be accomplished by defining an URL having, in the user-name portion the content of the legacy identifier, while in the domain-name portion contains the appropriate domain identifier, so as to form a routable FQDN (Full Qualified Domain Name). Said URL, once stored, for example, in ENUM-DNS, together with the rest of identifiers related to the legacy identifier, would allow to distinguish it from the others and further route the service according to it.

In the particular case of E.164 to URL translation; and, more precisely in case of E.164 to SIP-URL translation, the format of the URL to be populated shall contain the E.164 identifier in a distinguishable format. For example, for an E.164 such as 9876543210 which is "owned" by operator OperatorA in Sweden, the SIP-URL could have a format such as:

sip:9876543210@OperatorA.se.

optionally, the user-name portion could contain additional information for various purposes, such as reinforcing the use of this URL, indicate identifier subject to Number Portability, etc. For the same case used as example, a readily distinguishable formats could also be:
sip:9876543210.E164@OperatorA.se,
sip:non_ported_indication.9876543210@OperatorA.se,
sip:ported_indication.9876543210.ported identifier@OperatorC.it.

According to the invention, processing means in the CSCF (S-CSCF) selects in step 4 a distinguishable URL as described above that contains the E.164 identifier used in the query of step 2, and further route the service according to said. URL. This process, can imply a further query (not shown in FIG. 1) to a translation service (such as DNS) to obtain name and/or network address of the corresponding CSCF where to send the INVITE in step 5. Additionally, if an indication of "non_ ported" identifier was also received in the selected URL, a further query that could have been requested otherwise by this CSCF (S-CSCF) or by other serving node to obtain number portability information, can be avoided by considering said indication. Similarly, if an indication of "ported" identifier was also received in the selected URL, a further query that could have been requested otherwise by this CSCF (S-CSCF) or by other serving node to obtain number portability information, can be avoided by considering said indication together with the (new) ported identifier received that in this case, preferably, can contain the domain name of the (final) destination network handling the ported identifier.

Upon reception in step 5 of the INVITE in the CSCF that first receives services requests for a destination user (I-CSCF), I-CSCF of OperatorA in the example depicted in FIG. 1, further state-of-the-art steps can take place. This implies, for example, query to the home server entity, HSS, of OperatorA that will provide the address of an CSCF, acting as S-CSCF, that is in charge of serving to the user who has assigned the identifier received in the INVITE (i.e.: the destination user). This CSCF can apply a further routing criteria which, for said destination user, are available to this CSCF in this destination domain of OperatorA. Said routing criteria can be based, for example, on user preferences, user profile, user location, etc.; and can involve, for example, a subsequent change of the received identifier and/or service type (e.g.: from SIP session to circuit-switched telephony call), as it would happen if, for instance, the destination user has programmed a call forwarding towards another destination.

The invention claimed is:

1. A method for routing a service request in a telecommunication system towards a destination user, the method comprising the steps of:
   a) storing a collection of identifiers related to a first identifier assigned to said user;
   b) receiving a service request that comprises said first identifier;
   c) obtaining a plurality of identifiers among said collection of identifiers, the identifiers all equally usable for routing said service request;
   d) selecting a second identifier among said plurality of identifiers; and
   e) routing said service request according to said selected second identifier;
   wherein
   at least one identifier among said plurality of identifiers stored in step a) has a format that comprises a user-name portion and a domain-name portion, wherein the user-name portion contains said first identifier; and
   in step d) said second identifier is selected having a format comprising a user-name portion and a domain-name portion, wherein said user-name portion contains said first identifier.

2. The method of claim 1, wherein the step c) further comprises the steps of:
- c1) sending a query to a database that contains said collection of identifiers related to said first identifier, said query comprising the content of the first identifier;
- c2) receiving a response to said query that comprises a plurality of identifiers among said collection of identifiers.

3. The method of claim 1, wherein said first identifier is a E.164 number and said second identifier is a Uniform Resource Locator for Session Initiation Protocol.

4. The method of claim 3, wherein said second identifier contains said first identifier and number portability information.

5. A system for routing a service request in a telecommunication system, the system comprising:
- a data base, in charge of storing a collection of identifiers related to a first identifier associated to a user; and
- a serving node of said telecommunication system in charge of receiving a service request towards a destination user and further routing said service request;
- said data base being arranged to receive a query comprising the content of said first identifier, and to answer said query with a plurality of identifiers among said collection of identifiers, the plurality of identifiers all equally usable for routing said service request;
- said serving node being arranged for querying said data base upon reception of a service request that comprises said first identifier, and further routing said service request according to an identifier selected among said plurality of identifiers;

wherein said serving node is further arranged for routing said service request according to a second identifier selected from among said plurality of identifiers that has a format comprising a user-name portion and a domain-name portion, wherein said user-name portion contains said first identifier.

6. The system of claim 5, wherein said first identifier is a E.164 number and said second identifier is a Uniform Resource Locator for Session Initiation Protocol.

7. The system of claim 6, wherein said wherein said second identifier contains said first identifier and number portability information.

* * * * *

UNITED STATES PATENT AND TRADEMARK OFFICE
CERTIFICATE OF CORRECTION

| | |
|---|---|
| PATENT NO. | : 7,644,181 B2 |
| APPLICATION NO. | : 10/517180 |
| DATED | : January 5, 2010 |
| INVENTOR(S) | : Plata Andres et al. |

It is certified that error appears in the above-identified patent and that said Letters Patent is hereby corrected as shown below:

In Column 1, Line 9, delete "user" and insert -- user. --, therefor.

In Column 5, Line 55, delete "invention:" and insert -- invention. --, therefor.

In Column 6, Line 51, delete "operators" and insert -- operator's --, therefor.

In Column 7, Line 48, delete "a." and insert -- a --, therefor.

In Column 8, Line 13, delete "arpa" and insert -- arpa. --, therefor.

In Column 9, Line 65, delete "optionally" and insert -- Optionally --, therefor.

In Column 10, Lines 5-6, delete "ported identifier" and insert -- ported_identifier --, therefor.

In Column 10, Line 10, delete "said." and insert -- said --, therefor.

In Column 12, Line 19, in Claim 7, delete "wherein said wherein said" and insert -- wherein said --, therefor.

Signed and Sealed this

Sixteenth Day of March, 2010

David J. Kappos
*Director of the United States Patent and Trademark Office*